(12) United States Patent
Braun

(10) Patent No.: US 9,725,913 B2
(45) Date of Patent: Aug. 8, 2017

(54) PROCESS FOR PRODUCING PANELS WITH FOOTFALL AND AMBIENT SOUND DEADENING

(71) Applicant: Swiss Krono Tec AG, Lucerne (CH)

(72) Inventor: Roger Braun, Willisau (CH)

(73) Assignee: Swiss Krono Tec AG, Lucerne (CH)

( * ) Notice: Subject to any disclaimer, the term of this patent is extended or adjusted under 35 U.S.C. 154(b) by 172 days.

(21) Appl. No.: 14/178,315

(22) Filed: Feb. 12, 2014

(65) Prior Publication Data

US 2015/0152652 A1 Jun. 4, 2015

Related U.S. Application Data

(62) Division of application No. 11/895,950, filed on Aug. 28, 2007, now Pat. No. 8,795,814.

(30) Foreign Application Priority Data

Aug. 28, 2006 (DE) .......... 10 2006 040 084
Dec. 21, 2006 (DE) .......... 10 2006 061 852

(51) Int. Cl.
*E04F 15/20* (2006.01)
*B05D 3/12* (2006.01)
(Continued)

(52) U.S. Cl.
CPC .............. *E04F 15/206* (2013.01); *B05D 1/02* (2013.01); *B05D 1/38* (2013.01); *B05D 3/007* (2013.01); *B05D 3/12* (2013.01); *B05D 5/00* (2013.01); *B32B 3/30* (2013.01); *B32B 5/18* (2013.01); *B32B 7/12* (2013.01); *B32B 11/02* (2013.01); *B32B 11/046* (2013.01); *B32B 11/06* (2013.01); *B32B 21/02* (2013.01); *B32B 21/06* (2013.01); *B32B 21/08* (2013.01); *B32B 25/02* (2013.01); *B32B 25/06* (2013.01); *B32B 25/08* (2013.01); *B32B 25/18* (2013.01); *B32B 27/065* (2013.01); *B32B 27/08* (2013.01); *B32B 27/10* (2013.01); *B32B 27/18* (2013.01); *B32B 27/306* (2013.01); *B32B 27/32* (2013.01); *B32B 27/42* (2013.01);
(Continued)

(58) Field of Classification Search
CPC ........................................ B32B 3/30
See application file for complete search history.

(56) References Cited

U.S. PATENT DOCUMENTS 4,803,112 A    2/1989  Kakimoto et al.
5,525,694 A *  6/1996  Fortuin .............. B01D 67/0027
                                                264/288.4
(Continued)

FOREIGN PATENT DOCUMENTS

DE    10034407     10/2001
DE    10040276      3/2002
(Continued)

*Primary Examiner* — Xiao Zhao
(74) *Attorney, Agent, or Firm* — Bachman & LaPointe, PC

(57) ABSTRACT

A panel has an upper side facing the room in the use position and a lower side facing the floor. The lower side is coated, at least in sections, with a bonding layer composed of polymer. The bonding layer has an uneven surface on the outer side facing away from the panel, and has been coated at least in sections with a damping layer composed of polymer. A covering composed of panels, a process and an apparatus for producing the panels are also described.

11 Claims, 3 Drawing Sheets

(51) Int. Cl.
- *B32B 3/30* (2006.01)
- *E04F 15/02* (2006.01)
- *E04F 15/18* (2006.01)
- *B05D 1/02* (2006.01)
- *B05D 1/38* (2006.01)
- *B05D 3/00* (2006.01)
- *B05D 5/00* (2006.01)
- *B32B 5/18* (2006.01)
- *B32B 7/12* (2006.01)
- *B32B 11/02* (2006.01)
- *B32B 11/04* (2006.01)
- *B32B 11/06* (2006.01)
- *B32B 21/02* (2006.01)
- *B32B 21/06* (2006.01)
- *B32B 21/08* (2006.01)
- *B32B 25/02* (2006.01)
- *B32B 25/06* (2006.01)
- *B32B 25/08* (2006.01)
- *B32B 25/18* (2006.01)
- *B32B 27/06* (2006.01)
- *B32B 27/08* (2006.01)
- *B32B 27/10* (2006.01)
- *B32B 27/18* (2006.01)
- *B32B 27/30* (2006.01)
- *B32B 27/32* (2006.01)
- *B32B 27/42* (2006.01)
- *B32B 29/00* (2006.01)
- *E04F 15/04* (2006.01)

(52) U.S. Cl.
CPC ............ *B32B 29/007* (2013.01); *E04F 15/02* (2013.01); *E04F 15/181* (2013.01); *E04F 15/185* (2013.01); *E04F 15/20* (2013.01); *B32B 2260/028* (2013.01); *B32B 2260/046* (2013.01); *B32B 2264/02* (2013.01); *B32B 2266/025* (2013.01); *B32B 2307/102* (2013.01); *B32B 2307/50* (2013.01); *B32B 2307/554* (2013.01); *B32B 2307/72* (2013.01); *B32B 2471/00* (2013.01); *E04F 15/04* (2013.01); *E04F 2290/043* (2013.01); *Y10T 428/24521* (2015.01); *Y10T 428/24537* (2015.01); *Y10T 428/24612* (2015.01)

(56) References Cited

U.S. PATENT DOCUMENTS

| | | | |
|---|---|---|---|
| 5,879,781 A | 3/1999 | Mehta et al. | |
| 6,644,435 B2 | 11/2003 | Elsasser | |
| 8,397,456 B2 | 3/2013 | Ruhdorfer | |
| 2004/0197544 A1* | 10/2004 | Ramesh | E04F 15/18 428/304.4 |
| 2007/0049697 A1* | 3/2007 | Miyawaki | C08F 2/26 525/320 |

FOREIGN PATENT DOCUMENTS

| | | |
|---|---|---|
| DE | 10151614 | 4/2003 |
| DE | 20200235 | 5/2003 |
| DE | 20207218 | 9/2003 |
| DE | 102004056540 | 5/2006 |
| DE | 102005031187 | 1/2007 |
| DE | 102006040084 | 3/2008 |
| EP | 1113123 | 7/2001 |
| EP | 1219760 | 7/2002 |
| JP | 08319713 | 3/1996 |
| WO | 03/074817 | 9/2003 |
| WO | 2005018833 | 3/2005 |

* cited by examiner

PROCESS FOR PRODUCING PANELS WITH FOOTFALL AND AMBIENT SOUND DEADENING

CROSS REFERENCE TO RELATED APPLICATION

This application is a divisional application of application Ser. No. 11/895,950, filed Aug. 28, 2007.

BACKGROUND (1) Field of the Invention

The invention relates to a panel with footfall deadening and with ambient sound deadening. Footfall radiates from the surface set in vibration into adjacent rooms, especially into rooms beyond or below the surface. Ambient sound radiates from the surface set in vibration into the room bordered by this surface. Footfall and ambient sound occur in all surfaces which are set in vibration. They are particularly troublesome in the case of hard or dense surfaces. The invention therefore relates to panels which can be manufactured from any material. In particular, though, panels made from wood or wood material are taken into account, in particular panels composed of high-density fibreboard (HDF) or medium-density fibreboard (MDF). A typical application is floors laid in a floating manner.

(2) Prior Art

Both footfall and ambient sound are usually perceived as unpleasant and should therefore be deadened as far as possible. It has been known for many years that panels which are adhesive-bonded to the substrate cause less ambient sound than panels laid in a floating manner. Since laying in a floating manner offers great advantages especially in the subsequent incorporation of panels, approaches for the ambient sound deadening of panels laid in a floating manner have also been developed. For this purpose, separate layers of either closed-pore or open-pore light materials (cork, polyurethane foam panels, PE foam, PP foam, rubber mats, fibre mats, nonwovens, other elastic mats) are currently being laid under the panels. Alternatively, panels are provided directly with footfall deadening which is arranged on the side of the panel facing away from the room. Such panels with footfall deadening are known, for example, from DE 202 00 235 U1. Described there is a panel provided on the lower side with a polymer coating which has an uneven outer side pointing away from the panel. Panels coated with footfall deadening are easy to lay because the handling of an additional material is dispensed with.

For influencing ambient sound, coatings of panels are likewise known. For example, efforts are being made to be able to influence or reduce ambient sound by obtaining a particularly soft surface facing the room. Such a coating is described in DE 103 38 854 and WO 2005/018833.

The known measures for deadening footfall and ambient sound are, however, costly and inconvenient because different surfaces of the panel have to be processed. The measures described for ambient sound deadening can additionally not be implemented in every panel. When the panel has a coated and/or decorative surface, it is often impossible for technical reasons to include ambient sound deadening into this surface construction.

SUMMARY OF THE INVENTION

It is therefore an object of the invention to propose a panel and a covering with footfall deadening and ambient sound deadening which is easy to apply and can be used in many ways, a sound-reducing coating and a process and an apparatus for its production.

This object is achieved by a panel having an upper side facing the room in the use position and a lower side facing the floor, the lower side having a bonding layer at least in sections, which has an uneven surface on the side facing away from the panel, characterized in that, in the use position, the bonding layer has been coated at least in sections with a damping layer composed of polymer.

The uneven surface on the lower side of the panel is obtained by profiling. The term Aprofiling@ encompasses any regular or irregular structuring of the lower side of the panel, whether it be the direct embossing or milling of the lower side of the panel or the application of structured layers, for example by adhesive-bonding of synthetic resin-impregnated papers which have a structure required for sound deadening.

It has been found that the enlargement of the sound-deadening surface area which accompanies profiling has a positive effect on footfall deadening not only, for example, by converting the vertical deflection of the panel, for example by a step hitting the upper side of the panel, to a horizontal motion of the bonding layer because the projections in the bonding layer formed by the profiling are at right angles to the plate-shaped panel. This configuration of the bonding layer also has a positive effect on the ambient sound deadening.

The damping layer in the use position is bonded to the bonding layer over a large adjoining area as a result of the profiling. As a result, the ambient sound deadening is greatly improved. As a result of the profiled uneven design of the bonding layer, both in the bonding layer and in the damping layer, there is deadening over a wide frequency range. At the same time, the large common contact area of bonding layer and damping layer has the effect that the damping layer can have a thin design, which saves material and has the effect that the thickness of the panel overall can be kept low. The spreading of the ambient sound and the loudness can be damped by up to 40% and more by virtue of the invention.

In an inventive further development of the panel, it is appropriate to apply the bonding layer at the manufacture stage. The full extent of sound deadening is achieved through the embedding of the bonding layer into the damping layer. In this case, the damping layer can either be applied at the manufacture stage. However, it can advantageously also not cover the bonding layer at least in sections until in the use position. For example, it is immediately possible to lay out the damping layer as a mat at the installation stage and to lay the panels provided with the bonding layer thereon and to join them to give a covering. The uneven outer side of the bonding layer then projects into the damping layer. As a result of the embedding of the uneven outer side of the bonding layer in the damping layer, the full sound deadening is achieved. In the case of application of the damping layer at the manufacture stage, it can be covered if required, for example by protective paper.

The effectiveness of the inventive damping can, under some circumstances, be attributed to the fact that, when vibrations of the panel are generated, i.e. for example, in the case of walking on the panel, the two different polymer layers deform against one another and thus particularly effectively damp vibrations which are then destroyed by being converted to heat. It can be assumed that the peaks or projections disposed on the lower side of the bonding layer move within the damping layer, and that this kinetic energy is collected and dissipated at least partly in the damping layer.

In an advantageous embodiment of the invention, the panel is equipped with a damping layer which comprises a polymer of up to 1600 kg/m$^3$, preferably up to 1200 kg/m$^3$, more preferably of up to 600 kg/m$^3$. Polymers in this weight range absorb the vibrations which arise through excitation of the panel particularly efficiently and damp them effectively. A very thin damping layer is sufficient. In an advantageous design, the damping layer may be 0.4 mm thick or thicker. The damping layer preferably has a thickness of 0.2-3.0 mm. The damping layer preferably has at least such a thickness that the peaks or projections of the bonding layer are accommodated.

The polymers which are particularly suitable for damping of the ambient sound include plastically deformable, i.e. Asoft@, plastics in particular, which are readily processible and which ensure lasting effective ambient sound deadening. Materials with low resilience which can readily be plastically deformed are suitable as the damping layer. Typical examples of such polymers include polyolefins, soft ethylene-vinyl acetate, but also polyethylene, especially polyethylene foam film, thermoplastics in general, and also bitumen, butyl rubber, sealing materials or sealing putty and other plastically deformable materials have been found to be suitable in tests.

Addition of damping bodies to the polymer of the damping layer has been found to be an effective option for substantially damping the ambient sound. The use of damping bodies, especially when they are designed as hollow bodies composed of polymer, for example as polymer spheres (spherical hollow bodies), enables a reduction in the ambient sound compared to undamped panels by up to 40% and more. A typical example of such hollow polymer bodies are Expancel7 microspheres.

While the side of the damping layer facing towards the lower side of the panel, which adjoins the bonding layer, adopts the mirror image of the uneven configuration in accordance with the invention, the side of the damping layer facing towards the substrate may have a flat design in a preferred embodiment of the invention. As a result, a flat contact surface is firstly ensured. Secondly, minor unevenness in the substrate can be compensated for by the polymer of the damping layer, especially when a soft and light polymer is used as described above.

Advantageously, the damping layer is applied on a film which faces away from the bonding layer in the use position. This film is preferably designed as a vapour restrictor or vapour barrier.

The damping layer can be designed such that it covers the bonding layer only in sections. Even in the case of low coverage, positive deadening effects are measurable. However, the damping layer preferably covers the entire bonding layer in order to bring about maximum deadening.

In a first embodiment, the bonding layer may be produced from the material of the panel, simply by profiling the lower side of the panel correspondingly, for example embossing or milling it so as to form the desired uneven structure. This variant of the invention assumes that the density of the panel is suitable for the production of a bonding layer. Typically, this is the case, for example, in HDF panels. In many cases, however, this simple embodiment cannot be realized, especially when the lower side of the panel has been provided with a backing or when the panel consists of an excessively light material.

The second embodiment of the invention envisages producing the bonding layer from polymer which is bonded to the lower side of the panel. When the backing used is, for example, the frequently used melamine resin-impregnated paper, a corresponding structuring sheet which imparts the desired surface to the backing by shaping the thermoset melamine resin could be used in the pressing.

The bonding layer preferably has a density of more than 600 kg/m$^3$; the density is preferably more than 900 kg/m$^3$; the density is more preferably more than 1500 kg/m$^3$. It has been found to be effective for the bonding layer when light polymers are not used but rather as heavy a polymer as possible. Accordingly, it is also advantageous to use particles for the bonding layer which are as heavy as possible, for example barite or chalk particles. Preference is given to using hard EVA which may have been provided with particles for producing the bonding-deadening. Hard hotmelt adhesives were likewise used in tests.

The uneven surface of the bonding layer which faces away from the panel has been found to be essential for effective sound damping. The profile depth should be at least 0.2 mm, better up to 0.4 mm, preferably up to 0.8 mm, advantageously up to 1.2 mm, particularly advantageously up to 1.5 mm, preferably up to 4.0 mm. In most cases, the profile depth corresponds to the thickness of the bonding layer. However, it is also possible to select an embodiment in which the thickness of the bonding layer is greater than the profile depth, i.e. when the profiling generates projections, studs or the like whose height is less than the overall bonding layer. It is preferred that the profile depth—and hence also the bonding layer—can be kept at low thickness such that only a small use of polymer is required.

The uneven surface can be configured virtually as desired. In a preferred embodiment, it may have a pyramidal and/or rhombic configuration; the projections which arise in an uneven surface may be cylindrical, spherical and/or polygonal. Preference is given to elongated projections since they bring about a particularly high surface enlargement and since such projections deviate particularly distinctly from the alignment of the panel. Particular preference is given to a bonding layer configured with stud-like projections.

First tests have shown that, in a bonding layer with pyramidal projections, a separation of the projections of 0.2 mm to 0.8 mm, preferably of 0.3-0.5 mm, has led to good footfall and ambient sound deadening values.

In a preferred embodiment of the invention, the footfall deadening completely covers the lower side of the panel. The complete coating of the lower side prevents the formation of cavities which possibly act as resonance chambers and might counteract the inventive coating.

It has already been explained above that the panels may be produced from various materials. Frequently, they are panels of wood or wood material. Typical panels are one- or three-layer parquet panels of HDF, MDF or chipboard, for which the problem of sound deadening is additionally particularly clearly measurable and perceptible. However, panels of other materials, for example of mineral boards bonded with synthetic resin, extruded panels, polymer panels in general or the like, may also be provided with the inventive sound deadening system.

At this point, it should be noted that the inventive coating of the panel can be applied to wood material plates which have not yet been divided into individual panels. However, it is also possible to provide the finished divided panels with the inventive coating individually on the lower side. It is also of course immediately possible to apply the bonding layer to the wood material plates which have not yet been divided, and the deadening layer to the panels which have already been divided.

The object underlying the invention is also achieved by a covering, especially a floor covering, which comprises a plurality of panels with a sound-reducing layer on the lower side of the panels bonded to one another in a floating manner on a fixed substrate, the sound-reducing layer having at least one bonding layer with an uneven surface which has been coated at least in sections with a damping layer composed of polymer. The above-described panels may be manufactured in various dimensions. In some cases, large panels of several square metres in area may be used individually on small areas and have deadening action as described above. Typically, however, larger areas have to be covered and, for simpler processing, one possibility is to bond a multitude of individual panels to form a covering which is laid in a floating manner on the substrate. The panels can be bonded in any manner; it can be done, for example, by gluing or by mechanical interlocking.

In an advantageous further development, the covering is one whose panels are manufactured from wood, wood material and/or polymer. Any material which is suitable for the production of panels as, for example, described above is also suitable for producing the inventive covering. Preference is given to using chipboards, medium-density or high-density fibreboards, OSB panels or plywood.

The inventive covering is preferably a covering whose panels have been provided on the upper side with a decoration and an abrasion-resistant coating. It may, for example, be decorative paper with overlay arranged thereon or a decorative paint system with a topcoat of abrasion-resistant varnish. However, the panels may also have a decorative veneer protected by a varnish layer.

In an advantageous embodiment, the covering is one whose panels have a bonding layer shaped integrally on the core of the panel or have a bonding layer fixed on the lower side of the panel.

The inventive covering is preferably configured such that the at least one bonding layer and the damping layer have been produced as a self-contained sound-reducing coating which has been applied to the lower side of the panels at the manufacture or installation stage. As a result of the embodiment of the sound-reducing coating as a self-contained component, the inventive sound deadening can be handled very flexibly.

The invention further relates to a sound-reducing coating having a bonding layer of a hard polymer which has been provided with projections on one side, the projections being embedded into a damping layer of soft polymer. Materials, use and functioning of this sound-reducing coating have already been described above and are explained in detail in the working examples. It can be considered to be a particular advantage in the processing of the sound-reducing coating that application to the panels which are used to produce a covering is also possible at the manufacture stage. As a result, any panels can be laid with highly effective sound protection. The inventive sound-reducing coating is preferably used under coverings, especially floor coverings.

The invention further provides a process for producing panels which have sound deadening. The process according to the invention has the following steps: shaping the uneven outer side of a bonding layer at the manufacture stage, applying a damping layer composed of polymer to the bonding layer at least in sections in the use position.

In the simplest case, the lower side of the panel is shaped, especially when the material of the panel is suitable for this purpose and/or no backing has to be applied to the lower side of the panel. In this case, the panel can, for example, be provided with projections on the lower side with a correspondingly configured press platen. Frequently, however, it will be necessary to apply a bonding layer of polymer. This can likewise be applied to the lower side of the panel in the press, or it can subsequently be sprayed on, foamed on, rolled on or applied in any other manner.

The application of a footfall deadening system composed of polymer is known per se from the prior art. Also the shaping of an uneven outer side of the footfall deadening system is known from DE 202 00 235. The sound deadening which, as explained above, has to take account both of the footfall and the ambient sound is significantly improved in accordance with the invention when not only a footfall deadening system is applied. Instead, a further layer of polymer for ambient sound deadening is applied at least in sections at the manufacture or installation stage to the bonding layer configured in accordance with the invention. The embedding at least in sections of the profiled uneven outer side of the bonding layer brings about significantly improved ambient sound deadening without the action of the footfall deadening being impaired.

The application of the deadening layers can be effected in various ways, in each case adjusted to the polymers used and to the apparatus used for the application, for example by rolling, knife-coating, casting, foaming, spreading and/or spraying.

The polymers of the bonding layer and of the damping layer are preferably applied in the liquid state to the panel or to the bonding layer. As a result of the processing of the polymers in the liquid state, the application is particularly uniform and precise and sparing as a result.

For most polymers, processing in liquid state means processing at relatively high temperatures. In an advantageous embodiment of the process according to the invention, the bonding layer and/or the damping layer is therefore applied at elevated temperatures, preferably at temperatures of up to 190° C., more preferably of up to 150° C., advantageously of up to 100° C.

In order to be able to undertake any further processing steps required or in order to store the panels provided with the inventive sound deadening without any further measures, it may be found to be appropriate, in a preferred embodiment of the process according to the invention, to cool the panels after the application of the bonding-deadening and/or of the ambient sound deadening. The cooling can be effected, for example, by blowing with cold air.

The uneven outer side of the bonding layer is produced in an advantageous embodiment by virtue of a profiled mould acting on the outer side of the bonding layer. The moulds used may, for example, be profiled rollers or profiled press platens. Profiled press platens are preferably used when the bonding-deadening is applied before the coating of the panel in a press. This is typically done by pressing-on an amino resin-impregnated paper with a structuring sheet which impresses the desired structure into the backing which forms the lower side of the panel. The cured thermoset polymer then exhibits the uneven, comparatively rigid structures which are characteristic of the inventive bonding layer.

According to the invention, the damping layer is not profiled on the side facing away from the panel, the outer side. In order to ensure very uniform contact of the panel with the sound deadening on the substrate, in an advantageous embodiment of the invention, the outer side of the damping layer may be smoothed, for example drawn off with a doctor blade or rolled smooth.

Finally, the invention provides an apparatus for producing a panel with sound deadening, comprising means of applying a bonding layer composed of polymer and means of shaping an uneven outer side of this bonding layer, characterized in that means of applying a damping layer composed of polymer are provided on the bonding layer.

A generic apparatus for applying an uneven bonding layer and for shaping the outer side of this deadening layer are known, inter alia, from DE 202 00 235. The known apparatus is supplemented by means of applying a damping layer composed of polymer. These means may be designed as rollers, doctor blades, casting, spreading and/or spraying apparatus. These means are, as explained above, preferably supplemented by means of heating the polymer which are connected to the means for application via means of conveying liquid polymer. Both the means of applying the bonding layer and the means of applying the damping layer may be designed as means for applying liquid polymer.

In order to further accelerate the further processing of the panels provided with the inventive sound deadening, it is advantageously possible to provide means of cooling the damping layer and/or the bonding layer. The means of cooling, for example cold air blowers, enable, for example, the ambient sound deadening to be applied very rapidly after the application and shaping of the bonding-deadening. As a result, the production is streamlined significantly.

The means of shaping the uneven outer side of the bonding layer are preferably configured as profiled tools, for example as profiled rollers or as profiled press platens. These tools act on the outer side of the bonding layer composed of polymer and bring about plastic deformation. In this way, an outer side which has alternating projections and depressions is formed. The projections have surface sections which are not parallel to the surfaces of the panel. Especially surface sections of the projections which are virtually at right angles to the upper side or lower side of the panel contribute to improved sound deadening.

In a preferred embodiment of the inventive apparatus, means of smoothing the outer side of the damping layer are provided, which are intended to ensure substantially complete contact of the panel on the substrate.

BRIEF DESCRIPTION OF THE DRAWINGS

Details of the invention are explained in detail using the example of one embodiment of the invention. The figures show.

DETAILED DESCRIPTION OF THE PREFERRED EMBODIMENT(S)

Figure 1:
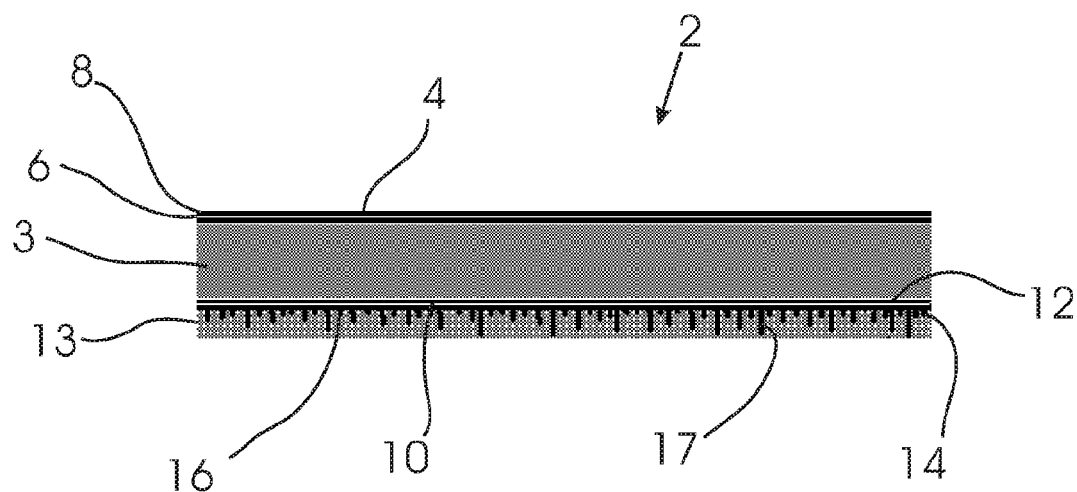
FIG. 1 a cross section through a schematic illustration of a panel provided with an inventive sound deadening system.

FIG. 1 shows a panel 2 with a core 3 composed of HDF whose upper side 4 is sealed with a resin-impregnated decorative paper 6 and an overlay 8. This forms a durable wear-resistant panel 2 which can be used, for example, as a floor covering. A backing 12 of paper which ensures the dimensional stability of the panel 2 is pressed onto the lower side 10 of the panel 2. The backing 12 counteracts the pulling forces which act on the panel 2 in the course of application of decorative paper and overlay 8.

A bonding layer 14 composed of hard EVA is applied to the lower side 10 of the panel 2, more specifically to the backing 12, by means of a profiled roller. The bonding layer 14 is uneven. It has projections 17 which are arranged alongside one another at a distance of 0.6 mm to 1.2 mm. The maximum thickness of the bonding layer 14 is 3 mm; the profile depth, i.e. the distance between the thickest application and the thinnest application of the bonding layer, is 1.2 mm.

The outer side 13 of the bonding layer 14 is covered by a damping layer 16 composed of polyolefins. The damping layer 16 is applied by means of a roller with a chromium-plated surface which brings about smoothing of the outer side of the damping layer 16.

Figure 2:
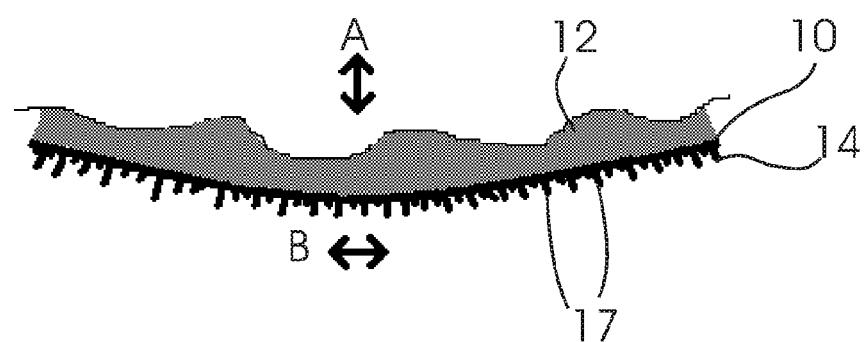
FIG. 2 a cross section through a schematic illustration of a panel provided with a bonding layer exposed to sound.
Figure 3:
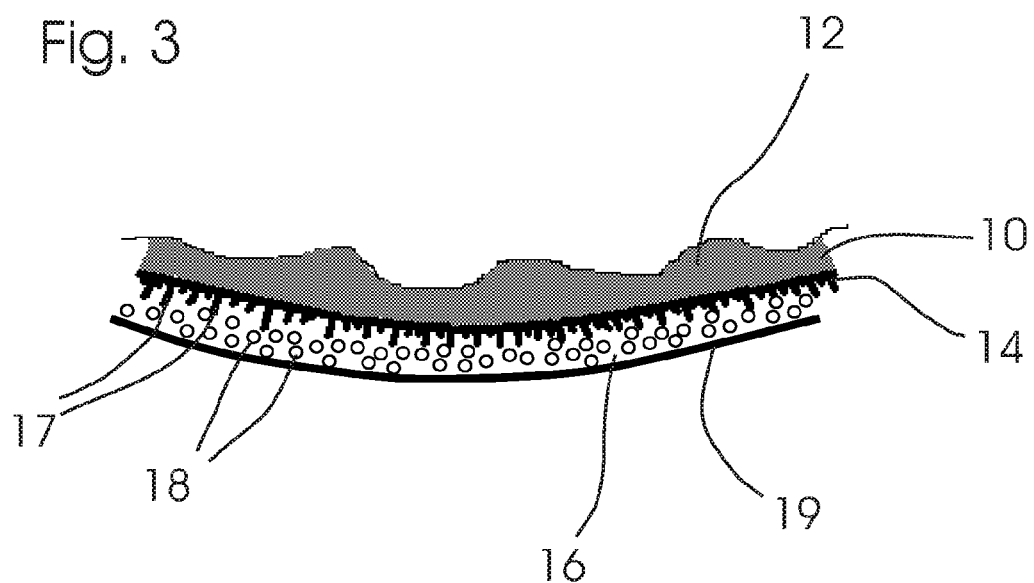
FIG. 3 a cross section through a schematic illustration of a panel provided with a bonding layer and a damping layer exposed to sound.

In the use position, the panel 2 rests on a floor. When the panel is walked on, the panel 2 is stressed mechanically and set in vibration. FIGS. 2 and 3 show this state. The vibration radiates firstly back into the room laid with the panel 2. The vibration secondly radiates onto the floor on which the panel 2 lies and is transmitted from there to rooms adjoining it.

FIG. 2 shows a schematic section from the panel 2, specifically its bonding layer 14 of hard EVA applied on the lower side 10. The projections 17 of the bonding layer 14, which are rigid owing to the material properties of the hard EVA, are set in vibration together with the panel 2 when walked on. The direction of force is indicated by the arrow A. However, they vibrate approximately at right angles based on the plane of the panel 2; see arrow B.

FIG. 3 shows the projections 17 of the bonding layer 14 embedded into the damping layer 16. The projections 17 are composed of hard EVA and vibrate or attempt to vibrate in the damping layer 16. As a result of this motion, the vibration of the panel 2 is effectively dissipated. The motion of the projections 17 is converted in the damping layer 16 composed of soft EVA first to friction and then to heat. The vibration of the projections 17 is additionally effectively damped by the damping bodies 18 present in the damping layer 16. The damping bodies 18 are spherical hollow bodies which have likewise been produced from elastic polymer. This conversion of the vibration energy introduced into the panel 2 by virtue of it being walked on to friction or heat energy brings about an effective improvement both in the footfall deadening and in the ambient sound deadening. As a result of the flat outer side 19 of the damping layer, good contact of the panel 2 on the substrate is ensured.

Figure 4:
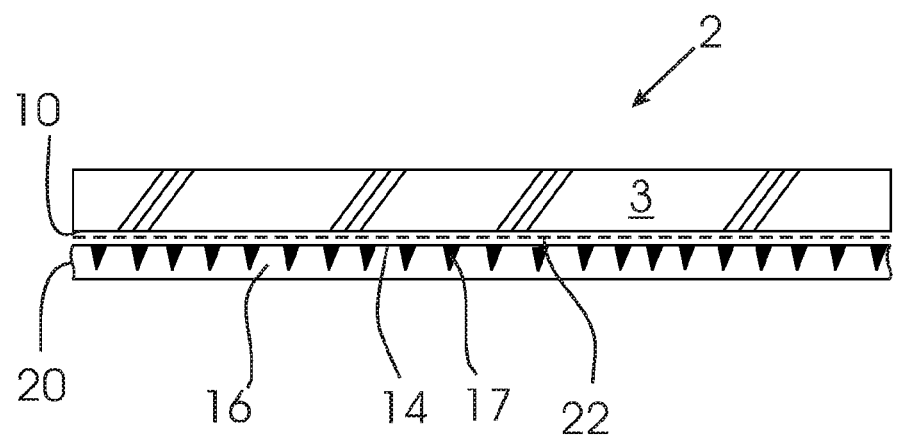
FIG. 4 a cross section through a schematic illustration of a second embodiment of a panel.

FIG. 4 shows a second embodiment of the inventive panel 2. The panel 2 has a core 3 composed of chipboard. The chipboard does not have any further coating; it is intended to serve as a comparative panel and substrate for a floor covering. For improved sound deadening, both with regard to footfall and with regard to ambient sound, a deadening mat 20 is adhesive-bonded to the lower side 10. The adhesive layer 22 is indicated in FIG. 4.

The deadening mat 20 is a sound-reducing coating. It can be adhesive-bonded at the manufacture or installation stage. It consists of the bonding layer 14 composed of hard polymer of low plastic deformability (hard EVA) with the projections 17 which project into the deadening layer 16. The deadening layer consists of soft, readily plastically deformable polymer (soft EVA). The bonding layer 14 is adhesive-bonded to the deadening layer 16.

The deadening mat 20 is adhesive-bonded to the lower side 10 of the panel 2 such that the bonding layer adjoins the lower side 10 of the panel. The adhesive layer 22 can be applied actually to the bonding layer 14 such that the two components adhere to one another when sound-reducing coating 20 and the panel 2 are joined. This embodiment of the inventive panel 2 with the separately designed deadening mat 20 shows the particularly flexible and simple handling of the deadening system.

Figure 5:
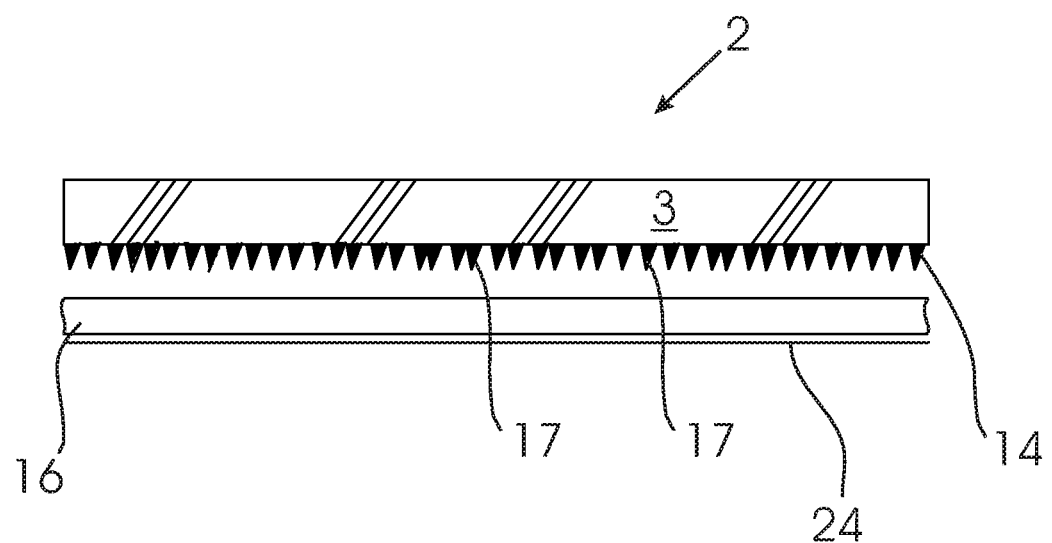
FIG. 5 a cross section through a schematic illustration of a third embodiment of a panel.

FIG. 5 shows a panel 2 whose core 3 consists of HDF and which otherwise has the same surface coatings and an identical backing to the panel shown in FIG. 1. At the manufacture stage, the bonding layer 14 with the projections 17 is applied. The damping layer 16, a 0.8 mm-thick soft EVA layer, is applied to a film 24 composed of polyethylene. In the use position, the panel 2 is laid onto the spread-out damping layer 16 such that the projections 17 sink into the damping layer 16 and plastically deform it as they do so.

What is claimed:

1. A process for producing panels which have sound deadening, comprising the steps of:
    applying a bonding layer to a lower side of a panel;
    shaping an outer side of the bonding layer, facing away from the panel, to an uneven surface comprising projections by virtue of a profiled tool in a press at temperatures between 100° C. and 190° C., said bonding layer having a density of more than 600 kg/m$^3$; and
    applying a damping layer which is composed of polymer to the outer side of the bonding layer at least in sections such that the damping layer facing towards the lower side of the panel adopts the mirror image of the uneven surface and that the projections are embedded in the damping layer.

2. The process according to claim 1, comprising composing the bonding layer from polymer which is applied to the lower side of the panel before the outer side is shaped.

3. The process according to claim 1, comprising applying the bonding layer and the damping layer by means of at least one of rolling, knife-coating, casting, spreading and spraying.

4. The process according to claim 1, comprising applying at least one of the polymers of the bonding layer and of the damping layer in the liquid state.

5. The process according to claim 1, further comprising applying at least one of the bonding layer and the damping layer at temperatures up to 190° C.

6. The process of claim 5, wherein said applying step comprises applying at least one of the bonding layer and damping layer at temperatures up to 150° C.

7. The process of claim 5, wherein said applying step comprises applying at least one of the bonding layer and damping layer at temperatures up to 100° C.

8. The process according to claim 1, further comprising cooling at least one of the bonding layer and the damping layer after application.

9. The process according to claim 1, further comprising shaping the outer side of the bonding layer to an uneven surface with using one of a profiled mould, a profiled roller and a profiled press platen.

10. The process according to claim 1, further comprising smoothing the damping layer after the application.

11. A process for producing panels which have sound deadening, comprising the steps of:
    at the manufacture stage, applying a bonding layer to a lower side of a panel and shaping an outer side of the bonding layer, facing away from the panel, with a profiled tool in a press at a temperature between 100° C. and 190° C., said bonding layer having a density of more than 600 kg/m$^3$, to produce an uneven surface comprising projections; and
    in a use position, applying a damping layer which is composed of polymer at least in sections to the outer side of the bonding layer such that the damping layer facing towards the lower side of the panel adopts the mirror image of the uneven surface, and that the projections are embedded in the damping layer.

* * * * *